UNITED STATES PATENT OFFICE.

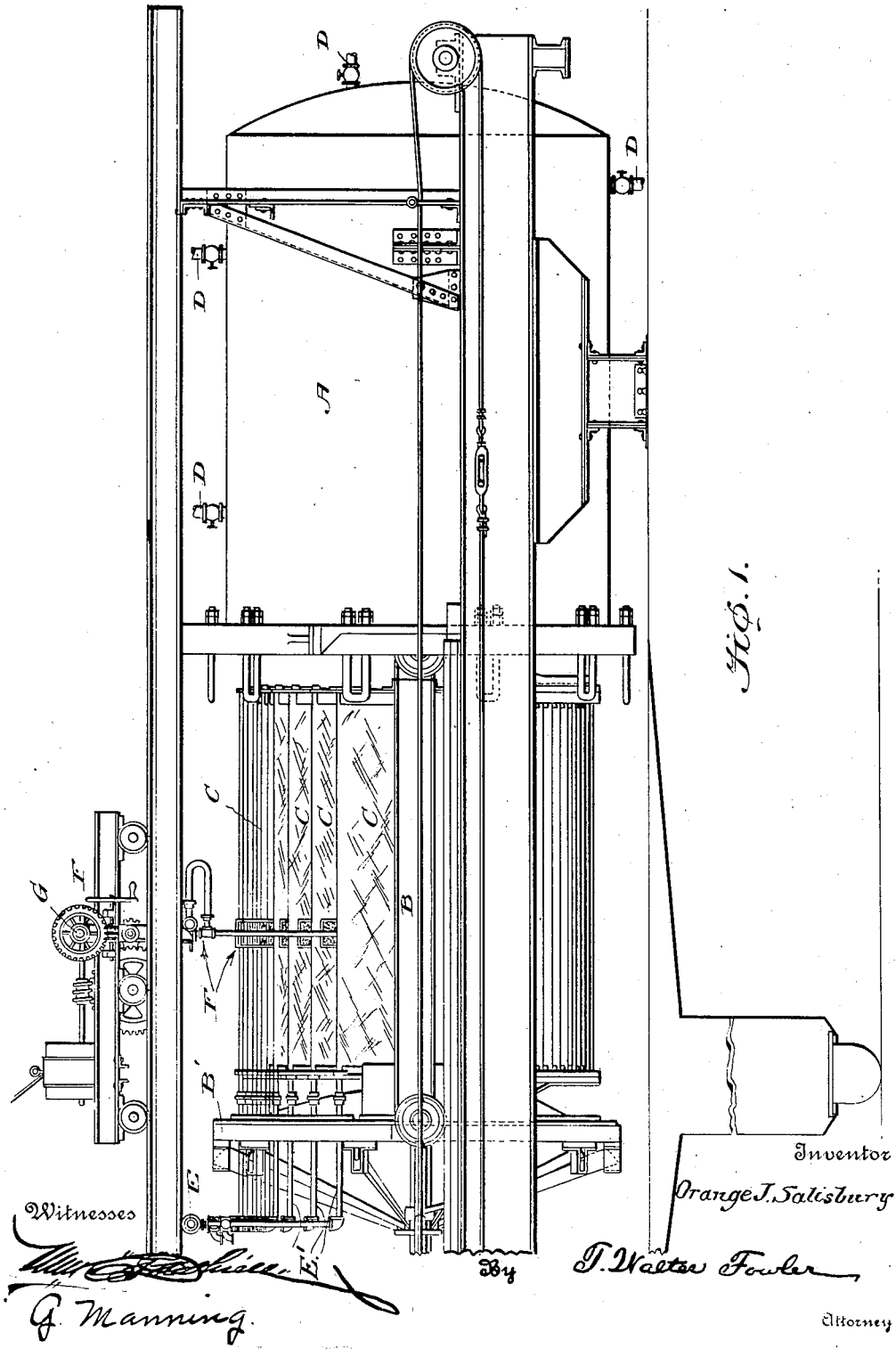

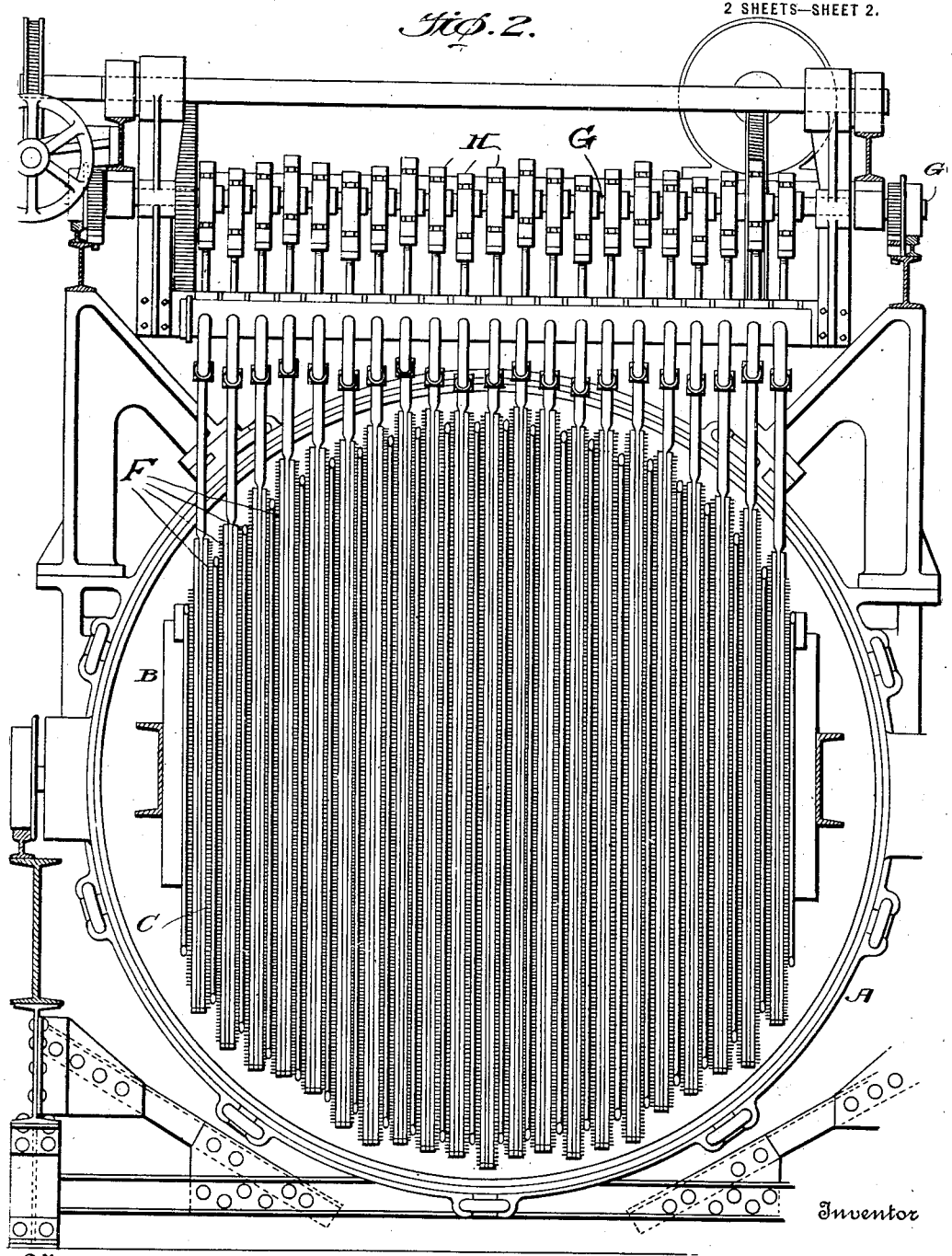

ORANGE JAMES SALISBURY, OF SALT LAKE CITY, UTAH.

PROCESS OF CLEANING FILTER MEDIUMS.

1,171,892.   Specification of Letters Patent.   Patented Feb. 15, 1916.

Application filed November 24, 1914. Serial No. 873,764.

*To all whom it may concern:*

Be it known that I, ORANGE J. SALISBURY, a citizen of the United States, residing at Salt Lake City, in the county of Salt Lake and State of Utah, have invented certain new and useful Improvements in Processes of Cleaning Filter Mediums, of which the following is a specification.

My invention relates to a new and useful process for cleansing filter mediums and filter cloths *in situ*, or without detaching the same from the filter proper; and the invention consists of the process substantially as I will hereinafter describe and claim.

In the accompanying drawings I have illustrated one type of apparatus by which my process may be carried out and wherein—

Figure 1 is a side elevation of a filter press supplied with means for cleansing the filter leaves or cloth by a scrubbing action. Fig. 2 is an end view of the same.

The aforesaid drawings represent one embodiment of an apparatus which will be found useful in the working of my process, but the invention is not limited to this type of apparatus or in fact to any specific character of apparatus, but comprehends and includes any and all means whereby a filter leaf, or frame, or a filter medium of any character may be cleansed and the sticky substances and impurities which accumulate thereon can be removed without detaching the filter leaves, or filter medium from its frame or support.

The type of apparatus shown for illustrative purpose is what is known as the "Kelly filter press", shown, for instance, in the Kelly Patents, 864,308, Aug. 27/07 and 865,912, Sept. 10/07, and forms no part of the present invention, which latter relates to a filtering process and more particularly to certain steps which if followed, will lead to economies in the operation of presses of the type disclosed and others of a like nature.

My process while useful in the metallurgical field for filtering metal bearing slimes, is particularly adapted for use with filters which are designed for treating sugar-juices and like products requiring filtration, as encountered in sugar refineries. The process will also be found useful in general chemical filtration work, and in any industry where it is desired to separate solids or impurities from liquids.

The filtering operations usually performed in sugar refineries contemplate the removal of the filter medium from the filter-frame or support in order that the filter medium, which may be of cloth and the like, and upon whose surface the sedimentary or solid matter will accumulate during the filtering function, can be thoroughly washed and cleansed by various mechanical washing devices. This operation of removing the filter medium from the filter frame or support entails great expense on account of labor, time, wear and tear on the filter medium as well as upon the mechanical washing devices used.

In my invention I have found that if certain steps or methods are employed it is feasible and practicable to cleanse the filter medium or filter cloth without detaching the same from its frame or support, but this is particularly true of those types of filters or filter presses which use what is commonly termed in the art as "open filter leaves or frames", upon which the filter medium such as cloth or any other suitable material, is attached, or carried and in which means are provided for the free passage of the filtrate within the body of the filter leaf.

To make my process perfectly clear and having reference to the accompanying drawings which show one method of carrying out the process in a practical manner, A represents a casing of a pressure type filter press within which is slidably mounted the carriage, B, containing a number of the filter frames or filter elements, C. In this particular apparatus, the filter frames are covered with filter cloth and so constructed that the fine particles in the solutions to be filtered adhere to the outside of the filter cloth or on the outer surface of the filter medium, whatever its character, and form very sticky cakes.

After the usual steps have been taken in operating the filter so that the cake has been formed on the leaves, or filter medium, and the same has been washed to extract the soluble sugar values in the cake, if sugar solutions are under treatment, or the mineral or chemical values which may remain in the cake, if the filter is used in metallurgical or chemical work, steam or hot water, or both is admitted to the casing, A, of the filter through a number of inlets, D, and the filter leaves are thoroughly immersed in the hot liquid.

The filter leaves or filter medium while in the casing, are subjected to a boiling or steaming action for a short time, to be gaged according to the physical properties of the material being handled. While this sweating of the filter elements is in progress, steam or compressed air or other fluid may be admitted at the same time to the inside of the filter element through a suitable pipe, E, having branches, E', leading through the removable head, B', of the filter press to the interior of the filter frames, care being taken to maintain low enough pressure on the inside of the filter elements so that they will not become distorted or damaged on account of the pressure exerted on the inner sides of the various filter leaves.

In Fig. 1 of the present drawings I have shown the filter carriage, B, with its filter leaves, C, and the head, B', withdrawn from the casing, A, after the leaves have been subjected to a boiling or steaming action, as before described, and before the filter leaves have been allowed to cool and practically while they are still steaming hot, at a temperature above normal. The filter elements or the outer surface of the filtering medium are brought into contact with some mechanically-operated cleansing agent, such as an automatic brushing-device, F, which in the present case includes a series of brushes extending parallel with the faces of the filtering medium and connected to a mechanism, say a shaft, G, having eccentrics, H, thereon, connected through their straps to the brushes, as in Fig. 2, whereby the brushes may be reciprocated over the outer surface of the filter medium, or an otherwise relative movement of the filtering surfaces and brushes may be effected for the purpose of cleansing by a scrubbing action, the outer sides of the filtering cloth or medium.

The steps which I prefer to follow in the cleansing medium are as follows:—Steam or hot water, or both, is admitted to the inside of the filter elements and at the same time a relative motion is maintained between the outsides of all of the filter elements and the brushing mechanism. By this means, the outside of the filtering elements are kept pressed against the brushing surfaces by admission of steam or other fluid, to the inside of the filtering elements, and the cake formed on the filtering elements is cleaned off by the scrubbing action of the brushes and by the spraying of water, by any suitable means, on the filtering elements while the brushing is in progress and for a short period thereafter.

Various means can be employed for securing the relative motion between the scrubbing agencies and the outside of the filtering elements and hence I do not limit my process to the use of any particular means for producing the relative movement of the filtering elements and brushing agents herein referred to. In fact, the essential steps of my process are to thoroughly cleanse the filter medium from sticky substances formed thereon during filtering operations by (1) keeping the filtering elements substantially hot; (2) maintaining the outer side of the filtering medium in contact with a brushing device; and (3) imparting a relative motion between the brushing device and the filter mediums and at the same time spraying water or other fluid on the filter medium, while steam or other fluid under pressure, is admitted to the inside of the filter mediums.

I have discovered that if the above steps are carried out the filter cloths or filter mediums mounted upon filter frames or supports, can be readily cleansed of the sticky waxy impurities encountered in the refining of sugar, or of impurities in the form of solid matter, which is allowed to form upon the outer sides of the filter.

While various methods have been used for scrubbing filter mediums and filter cloths when the same have been taken off of the frames or other forms of filter supporting devices, and the cloths when taken off have been put through washing and scrubbing means, I do not know of any previous method wherein the sticky substances and impurities accumulating on the outside of the filter can be cleansed from the filter leaves or from the filter mediums of whatever character without detaching the same from the frame or support of the filter proper.

Having thus described my invention what I claim as new and desire to secure by Letters Patent is:—

1. The method herein described, of cleaning filter mediums of sticky substances formed thereon during the filtering operations, said method consisting, essentially, in heating the filter medium in the presence of moisture in the chamber in which filtration occurs; then removing the filter medium from the chamber and while the medium is still heated and maintaining the moist filter medium in contact with a brushing agent; and then imparting a relative motion to the contacting surface of the filter medium and brushing agent.

2. The method herein described of cleaning filter mediums of sticky substances formed thereon during the filtering operations, said method consisting, essentially, in heating the filter medium *in situ* in the presence of moisture in the chamber in which filtration occurs; then removing the filter medium from the chamber and while the medium remains heated; then maintaining a brushing agent in contact with the surfaces of the heated moist medium to be cleaned, and imparting a relative motion between the brushing agent and said heated filter medium.

3. The method herein described of cleaning filter mediums of sticky substances formed thereon during the filtering operations, said method consisting, essentially, in heating the filter medium *in situ* in the presence of moisture in the chamber in which filtration occurs; then removing the filter medium from the chamber and while the medium remains heated; then maintaining a brushing agent in contact with the surfaces of the heated moist medium to be cleaned; imparting a relative motion between the brushing agent and said heated filter medium, and at the same time supplying a heated washing fluid to the surface of the filter medium being brushed.

4. The method herein described of cleaning filter mediums of sticky substances formed thereon during the filtering operations, said method consisting, essentially, in softening the adhering impurities by the application of heat and moisture, while the filter medium remains in the filtering chamber; then withdrawing the filter medium from said chamber while in its heated condition; and then subjecting the heated moist filtering medium to substantially a brushing action before the medium is allowed to substantially cool.

5. The method herein described, of cleaning filter mediums from sticky substances formed thereon during filtering operations, said method consisting, essentially, in heating the filter medium without removal from its support, brushing the outer surface of the medium; and maintaining the filter medium in a heated condition during the brushing operation, by admitting a heated fluid under pressure to the inner side of said filter medium.

6. The method herein described, of cleaning filter mediums from sticky substances formed thereon during filtering operations, said method consisting, essentially, in heating the filter medium without removal from its support; brushing the outer surface of the medium; and maintaining the filter medium in a heated condition during the brushing operation, by admitting a heated fluid under pressure to the inner side of said filter medium and at the same time applying a heated washing fluid to the surface being brushed.

In testimony whereof I affix my signature in presence of two witnesses.

ORANGE JAMES SALISBURY.

Witnesses:
   JAMES B. WALKER, Jr.,
   ALBERT L. GENTER.